April 23, 1963 F. E. HURST 3,086,311
DEVICE FOR HOLDING A FISH
Filed May 8, 1961
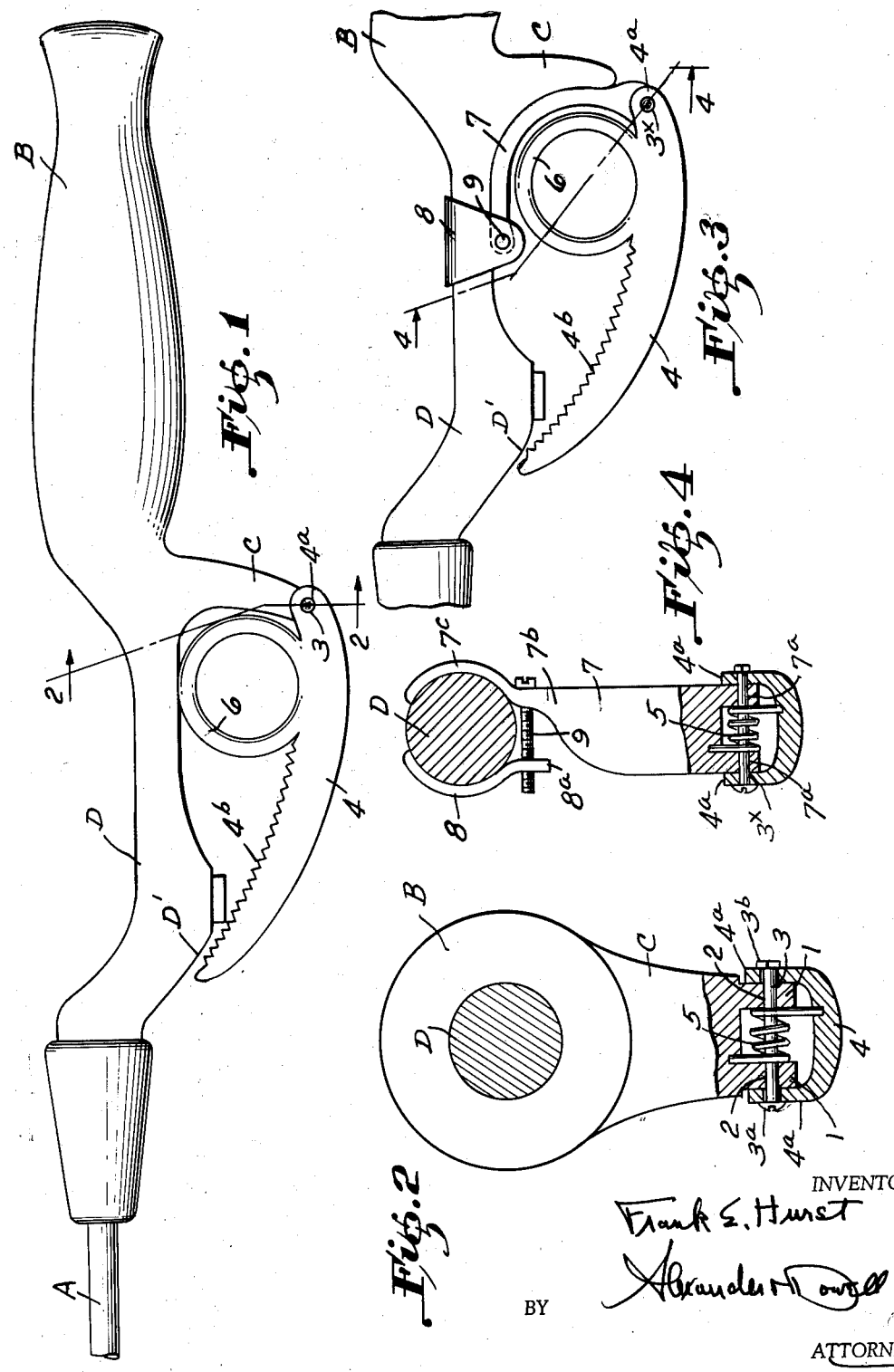
INVENTOR
Frank E. Hurst
BY Alexander Dowell
ATTORNEYS

United States Patent Office

3,086,311
Patented Apr. 23, 1963

3,086,311
DEVICE FOR HOLDING A FISH
Frank E. Hurst, 820 Piney Woods Road, La Grange, Ga.
Filed May 8, 1961, Ser. No. 108,641
8 Claims. (Cl. 43—25)

This invention is a novel fish-holding device adapted for attachment to, or to be formed integrally with a fishing rod or the like adjacent the handle of the rod, said attachment being in the nature of a jaw adapted to hold a fish or the like for ready removal of the fish-hook from the mouth of the fish or for other operations on the fish which has just been caught. One of the main advantages of my device resides in the fact that it is a part of the fishing rod so that when a fisherman reels in a catch he already has the holding device in his hand, and he does not have to first put the rod down and then pick up another device.

Another object of my invention is to provide an attachment for holding fish which may be readily built into a fishing rod, or is adaptable for attachment to the rod, so that same might be marketed separately from the rod and thereafter added thereto.

A further object of the invention is to provide a device of the above type which comprises an arm and a jaw with means rendering it possible to clamp the fish-holder onto a fishing rod without altering, changing or redesigning the rod in any way.

Further minor objects of the invention will be hereinafter set forth.

I will explain the invention with reference to the accompanying drawing which illustrates several practical embodiments thereof, to enable others familiar with the art to adopt and use the same, and will summarize in the claims the novel features of construction and novel combinations of parts, for which protection is desired.

In said drawing:

FIG. 1 is a side elevation of the handle end of a fishing rod, showing my novel fish-holding device integrally applied thereto and showing the jaw in normal closed or operative position against the handle.

FIG. 2 is an enlarged vertical section on the line 2—2, FIG. 1.

FIG. 3 is a side elevation similar to FIG. 1 showing the fish-holding device applied as an attachment to the handle end of the fishing rod, and also showing the jaw in closed position.

FIG. 4 is an enlarged section on the line 4—4, FIG. 3.

As shown in FIGS. 1 and 2, the fishing rod A is provided with a handle B and with the customary finger-engageable lug C which extends laterally from the front end of the handle in the usual manner, the handle B having a joggled or offset portion D therein forward of the finger-engageable lug C. The particular form of the finger-engageable lug C and the joggled or offset portion D forms no part of my present invention except that the forward portion D' is adapted to firmly contact the jaw 4A of the fish-holding device, hereinafter described.

According to my invention, the outer end of the finger-engageable lug C is provided with spaced parallel lugs 1, FIG. 2, which are provided with aligned bores 2 for the reception of a pivot pin 3 or the like, which pin is provided with heads 3a, 3b. Pivotally mounted on pin 3 is a jaw 4 which is shown as being somewhat arcuate in shape to conform with the shape of the handle face D' and provided with serrations 4b on the inner surface adjacent its outer end, which serrations are adapted to contact the inclined portion D' of the offset or joggled portion D of the handle, as shown in FIG. 1. The inner end of the jaw 4 is bifurcated as at 4a and provided with aligned holes which also receive the pin 3, as shown in FIG. 2, whereby the jaw is pivotally mounted on the finged-engageable lug C.

In order to maintain the serrated portion 4a of jaw 4 in normal contact with the inclined portion D' of handle portion D, a coiled spring 5, FIG. 2, is positioned around the pin 3 between the lugs 1, one end of the spring contacting the finger-engageable lug C and the other end of the spring contacting the jaw 4 so that the spring 5 will normally tend to swing the jaw 4 upwardly into the position shown in FIG. 1. However, the jaw can be swung away from the portion D' when it is desired to insert a fish or the like between the jaw 4 and the portion D'.

In order to facilitate the swinging of the jaw 4 away from the portion D' I provide a ring portion 6 on the jaw 4 adjacent the pivot pin 3, which ring is preferably disposed closely adjacent to the finger-engageable lug C and would normally be disposed within the angle formed between the underside of the offset portion D and the front wall of the finger-engageable lug C, as shown in FIG. 1.

Thus, when using my novel fish-holding device, the jaw 4, which is disposed adjacent the handle portion D', may hold, between the jaw and the portion D', the fish which has just been caught by the fisherman, the clamping pressure being exerted by the spring 5, and the forefinger of the operator inserted in ring 6 thereby enabling the user to control the fish without touching it, also providing a firmer and more reliable grip on the fish while removing the hook and while putting the fish on a string, also avoiding injury to the fisherman from direct contact with fish fins, and also avoiding dirty, smelly hands which result from fish handling. My device can also be used to firmly grip the fish while scaling same; can also be used for clamping the rod to a boat seat or some other support to insure its safety against falling into the water, or other damage thereto while it is not in use. The user's forefinger may be inserted in the ring 6 and also used to open the jaw 4 of the device for receiving and holding the fish. The spring 5 yieldably holds the jaw 4 in closed position as shown in FIG. 1 until forced open by the user's forefinger inserted in the ring 6. The serrations 4b on the jaw provide for a better grip on the jaw 4 on the fish.

FIGS. 3 and 4 show a modification in which the fish-holding device is attachable to or detachable from the handle of the fishing rod so that the device may be sold separately as a unit to be applied to the handle of a fishing rod or the like. In Figs. 3 and 4 the fishing rod and handle are generally similar to that shown in FIG. 1, with the exception that the finger-engageable lug C does not form a pivot for the jaw 4. In FIGS. 3 and 4 similar parts hereinbefore discussed are similarly lettered or numbered.

In this modification the end 4a of the clamp 4 is flanged as in FIG. 2 and drilled to receive the pivot pin 3x, but instead of the pin 3x being mounted in the finger-engageable lug C I provide a separate mounting member 7 which is substantially arcuate in shape to suit the curvature of the front face of the finger-engageable lug C and the underside of the offset portion D, as shown in FIG. 3, and the outer end of the member 7 adjacent the jaw 4 is provided with lugs 7a, FIG. 4 which contain aligned holes receiving the pivot pin 3x; also around the pin 3x is a coiled spring 5 as in FIG. 2, with one end engaging the fixed mounting 7 and the other end engaging the movable jaw 4.

The forward end of the mounting member 7 is narrowed as at 7b and terminates in an arcuate portion 7c which engages one side of the periphery of the offset portion D and cooperates with an opposed arcuate clamp 8 disposed at the other side of the offset portion D, the clamp 8 being provided below the offset portion D with an extension 8a having a threaded bore for the reception of a screw 9 which passes through a bore in the portion 7b and into the threaded bore of the extension 8a so that when the screw 9 is tightened the mounting member 7 will be securely clamped onto the offset portion D.

By the use of the mounting member 7 and clamp 8, the device may be attached to any fishing rod very simply and easily without altering the rod in any way, and without changing or redesigning the fishing rod. While FIGS. 3 and 4 show the rod as having a finger-engageable lug C, it is obvious that the device could be applied to or attached to any other type of fishing rod, or even to a cane pole, as the mounting member 7 will be securely clamped to the handle, and the mounting member 7 when so attached will curve downwardly or laterally away from the rod, permitting the jaw 4 to have the proper pivot and leverage. The device shown in FIGS. 3 and 4 would obviously be used in the same manner above described in connection with the modification shown in FIGS. 1 and 2.

I do not limit my invention to the exact forms shown in the drawing, for obviously changes may be made therein within the scope of the claims.

I claim:

1. A fish-holding device for fishing rods having a handle and having a downwardly extending finger engageable lug on said handle, said device comprising a jaw member pivotally attached at its rear end to the outer end of said lug, the outer end portion of the jaw member being adapted to contact the underside of the handle; and means on the upper surface of said jaw member positioned closely adjacent said lug and extending upwardly a substantial distance beyond the pivot connection towards the handle to enable the user to have proper leverage when using the forefinger of the same hand with which he is holding the rod to open and close the jaw member; and means normally yieldably urging the jaw member into contact with the handle.

2. In a device as set forth in claim 1, said yieldable means comprising a spring coiled around the pivot and having its ends respectively engaging the handle and jaw.

3. In a device as set forth in claim 1, said lug comprising a bracket having one end detachably secured to said handle and its other end extending laterally of the handle, the jaw being pivoted to said extending end of the bracket; and said yieldable means comprising a spring coiled around the pivot and having its ends respectively engaging the bracket and jaw.

4. In a device as set forth in claim 3, the end of the bracket opposite from the pivot forming one member of a splite lamp and engaging one side of the handle; an opposed clamp member for engaging the other side of the handle; and means for drawing the clamp members together.

5. In a device as set forth in claim 1, said opening and closing means comprising a finger-engaging member on the jaw face adjacent the handle, said member being normally disposed in the angle formed by the lug.

6. In a device as set forth in claim 5, said opening and closing means comprising a finger-engaging ring disposed in the angle formed by the said lug.

7. In a device as set forth in claim 1, the outer portion of the jaw member being provided with serrations on its face to engage the handle.

8. In a device as set forth in claim 1, a bracket detachably secured to the said handle in advance of the finger-engageable lug, said bracket being shaped to conform with that of the finger-engageable lug and form an extension thereof; the jaw being pivoted to the outer end of the bracket; and said means comprising a spring coiled around the pivot and having its ends respectively engaging the bracket and jaw.

References Cited in the file of this patent

UNITED STATES PATENTS

| | | |
|---|---|---|
| 1,459,438 | Brand | June 19, 1923 |
| 2,298,580 | Miron | Oct. 13, 1942 |
| 2,603,016 | Mix | July 15, 1952 |
| 2,675,568 | King | Apr. 20, 1954 |
| 2,714,272 | Tuttle | Aug. 2, 1955 |
| 2,804,711 | Kozar | Sept. 3, 1957 |
| 2,836,920 | Sabara | July 3, 1958 |

FOREIGN PATENTS

| | | |
|---|---|---|
| 23,090 | Finland | Mar. 31, 1949 |
| 411,900 | France | Apr. 20, 1910 |